(12) United States Patent
Lake

(10) Patent No.: US 9,766,062 B2
(45) Date of Patent: Sep. 19, 2017

(54) METHOD OF DOCUMENTING A POSITION OF AN UNDERGROUND UTILITY

(71) Applicant: Frederick D. Lake, Coquitlam (CA)

(72) Inventor: Frederick D. Lake, Coquitlam (CA)

( * ) Notice: Subject to any disclaimer, the term of this patent is extended or adjusted under 35 U.S.C. 154(b) by 217 days.

(21) Appl. No.: 14/747,030

(22) Filed: Jun. 23, 2015

(65) Prior Publication Data

US 2015/0377615 A1  Dec. 31, 2015

Related U.S. Application Data

(60) Provisional application No. 62/022,417, filed on Jul. 9, 2014.

(30) Foreign Application Priority Data

Jun. 30, 2014 (CA) .................................. 2855414

(51) Int. Cl.
*G01B 11/28* (2006.01)
*G06K 9/00* (2006.01)
(Continued)

(52) U.S. Cl.
CPC .......... *G01B 11/28* (2013.01); *G06K 9/00476* (2013.01); *G06K 9/00637* (2013.01); *G06T 11/60* (2013.01); *H04N 7/185* (2013.01)

(58) Field of Classification Search
CPC ............... G01B 11/28; G06K 9/00637; G06K 9/00476; G06T 11/60; H04N 7/185
See application file for complete search history.

(56) References Cited

U.S. PATENT DOCUMENTS

| 4,699,838 | A | * | 10/1987 | Gilbert | .................... B32B 15/08 |
| | | | | | 116/211 |
| 5,592,785 | A | * | 1/1997 | Gavin | ..................... E02D 29/12 |
| | | | | | 16/444 |

(Continued)

OTHER PUBLICATIONS http://higheye.ca/geo-mapping.html, Higheye Aerial Imaging Inc., Geo Mapping, Aerial Surveying & Orthomosaics, Aerial 2D & 3D Orthomosaic Imaging, GIS Services and Geo Referenced DEM/DSM Models, Jun. 22, 2015, pp. 1-5.

(Continued)

*Primary Examiner* — Jay Patel
*Assistant Examiner* — Joseph Suh
(74) *Attorney, Agent, or Firm* — Davis & Bujold PLLC; Michael J. Bujold

(57) ABSTRACT

A method of documenting a position of an underground utility which involves placing temporary markings on a ground surface designating an underground location of the underground utility. A photograph is then taken providing an overhead panoramic view of the temporary markings designating the underground location of the underground utility. The photograph includes visual landmarks, such as sidewalks, driveways, trees and hedges, thereby providing a visual reference. After excavation has taken place and the temporary markings have been removed along with the ground surface, using the photograph to reconfirm the underground location of the underground utility by using the visual reference provided by the relationship that the temporary markings depicted in the photograph bear to the visual landmarks that remain after excavation.

12 Claims, 3 Drawing Sheets

(51) Int. Cl.
   *H04N 7/18*   (2006.01)
   *G06T 11/60*  (2006.01)

(56) References Cited

U.S. PATENT DOCUMENTS

| | | | | |
|---|---|---|---|---|
| 6,413,013 B1* | 7/2002 | Requena | ............... | E01C 23/185 156/355 |
| 6,549,827 B1* | 4/2003 | Yen | ............... | G08G 1/202 169/60 |
| 9,046,413 B2* | 6/2015 | Nielsen | ............... | G01J 3/0264 |
| 2004/0059539 A1* | 3/2004 | Otsuki | ............... | G01C 15/00 702/150 |
| 2009/0012995 A1* | 1/2009 | Sartor | ............... | H04N 21/2187 |
| 2009/0021514 A1* | 1/2009 | Klusza | ............... | G06F 17/3028 345/419 |
| 2010/0171763 A1* | 7/2010 | Bhatt | ............... | G06F 17/3087 345/660 |
| 2011/0184980 A1* | 7/2011 | Jeong | ............... | G06F 17/30265 707/771 |
| 2011/0197153 A1* | 8/2011 | King | ............... | G06F 3/04883 715/769 |
| 2012/0007982 A1* | 1/2012 | Giuffrida | ............... | G01C 11/02 348/144 |
| 2012/0197930 A1* | 8/2012 | Newell | ............... | G06F 17/3082 707/769 |
| 2013/0211623 A1* | 8/2013 | Thompson | ............... | G07C 5/008 701/2 |
| 2014/0204197 A1* | 7/2014 | Olsson | ............... | H04N 5/23203 348/84 |
| 2014/0263822 A1* | 9/2014 | Malveaux | ............... | B64C 39/024 244/17.23 |
| 2014/0266213 A1* | 9/2014 | Olsson | ............... | G01V 3/17 324/329 |
| 2014/0368715 A1* | 12/2014 | Shih | ............... | G01N 21/41 348/311 |
| 2014/0369595 A1* | 12/2014 | Pavlidis | ............... | G06T 17/05 382/154 |
| 2015/0057801 A1* | 2/2015 | Stephens, Jr. | ............... | B25J 9/1689 700/259 |
| 2015/0350858 A1* | 12/2015 | Reitnour | ............... | G06F 3/04817 455/404.2 |
| 2015/0363914 A1* | 12/2015 | Boyle | ............... | G06T 3/4038 345/629 |

OTHER PUBLICATIONS http://higheye.ca/engineering-and-construction.html, Higheye Aerial Imaging Inc., Engineering and Construction—Aerial Services, Jun. 22, 2015, pp. 1-5.

* cited by examiner

METHOD OF DOCUMENTING A POSITION OF AN UNDERGROUND UTILITY

FIELD

There is described a method of documenting a position of an underground utility, such as a gas line, as well as the boundaries of a right of way across a property associated with the underground utility.

BACKGROUND

Utility Companies have established call centres that ground disturbers may call before excavating on public or private property. The function of the call centre is to provide information to the public in order to avoid underground utilities from being damaged during excavation and in order to avoid garages and other structures from being built over a portion of a utility right of way. The call centres send out utility company personnel armed with maps and locating equipment (electromagnetic or ground penetrating radar) to locate the boundary of the right of way or the location of the underground utility. Having located the boundary or the underground utility, ground markings are made (typically with spray paint) to assist the ground disturber. Notwithstanding the care taken, accidents are still occurring. There is, therefore, a need for a method of documenting a position of an underground utility that is easier for a ground disturber to comprehend; bearing in mind the ground disturber may be a home owner with little or no experience in these matters or a labourer with relatively little formal education.

SUMMARY

There is provided a method of documenting a position of an underground utility which involves overlaying temporary marking strips on the underground utility to make markings designating the underground utility vivid and then taking at least one photograph of the markings designating the underground utility, thereby providing a visual reference.

The manner of marking by utility company personnel is intentionally temporary in nature, so not as to leave a permanent scar on property. However, a first step in beginning excavation is to remove a top layer of asphalt, sod, top soil, or the like. The markings made by utility company personnel are unavoidably removed with the top layer, so that the markings intended to provide guidance to the ground disturber are removed before excavation has begun in earnest. With the method, as described above, the digital photograph provides a permanent record. By referring to the photograph, the ground disturber can determine where the markings were with reference to sidewalks, driveways, hedges and other visual references depicted in the photograph.

Although beneficial results may be obtained through the use of the method described above, even more beneficial results may be obtained the step of taking of the at least one photograph is performed with a digital camera having a global positioning system (GPS) application. A further step may then be taken of mapping with the GPS application in the digital camera the markings depicted in the at least one photograph, such that GPS data can be superimposed on a neighbourhood map of an internet mapping site. GOOGLE MAPS (a Trademark of Google Inc) is one such application. Using an internet mapping site, such as GOOGLE MAPS, the ground disturber is able to "zoom in" and "zoom out" to gain a better understanding of the positioning of the marking as it relates to the worksite and adjoining properties.

With some projects, a single digital photograph will be adequate. However, with more elaborate projects the marking may be difficult to capture in a single digital photograph. In such cases, more than one digital photograph is taken of the marking and the digital photographs are electronically stitched together to form a composite photograph.

This method can be implemented simply by equipping field personnel with a smart phone or digital camera, as an increasing number of smart phones and digital camera are being manufactured have both a digital camera and GPS capability.

The method works fine when taken with a ground level digital photograph. However, it tends to work even better when the digital photograph is taken from a vantage point providing a panoramic view of the marking.

It will be appreciated that the mapping with the GPS application may take place contemporaneously with locating the underground utility or subsequent to locating the underground utility. This is done by taking GPS readings at set time intervals.

It is preferred that the at least one photograph is a colour photograph and the temporary marking strips are colour coded to designate a nature of each underground utility depicted in the photograph.

If desired, the GPS mapping may be accompanied by an audio commentary that provides further information to the ground disturber.

BRIEF DESCRIPTION OF THE DRAWINGS

These and other features will become more apparent from the following description in which reference is made to the appended drawings, the drawings are for the purpose of illustration only and are not intended to be in any way limiting, wherein.

DETAILED DESCRIPTION

A method of documenting a position of an underground utility will now be described with reference to FIG. 1 through 5.

Figure 1:
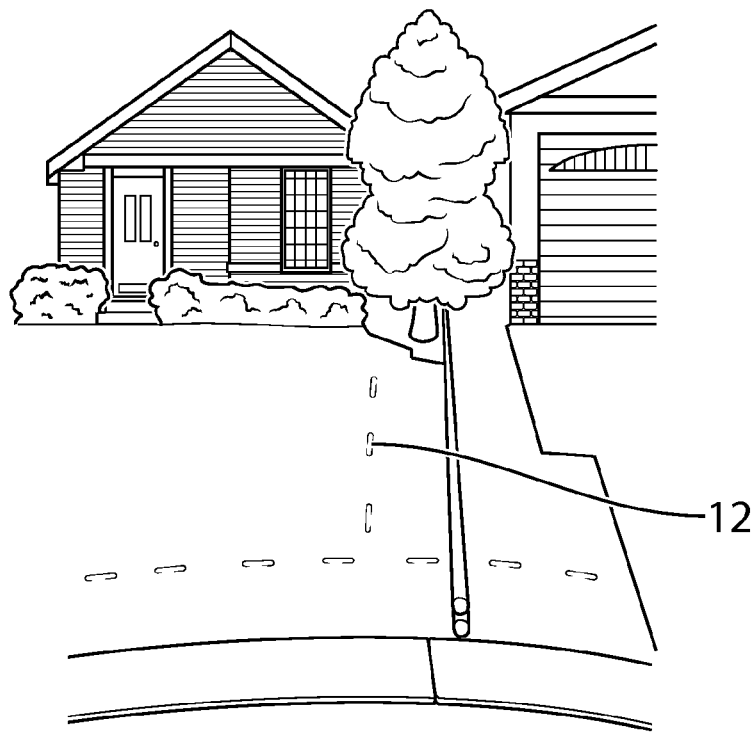
FIG. 1 is a digital photograph of an underground utility.
Figure 2:
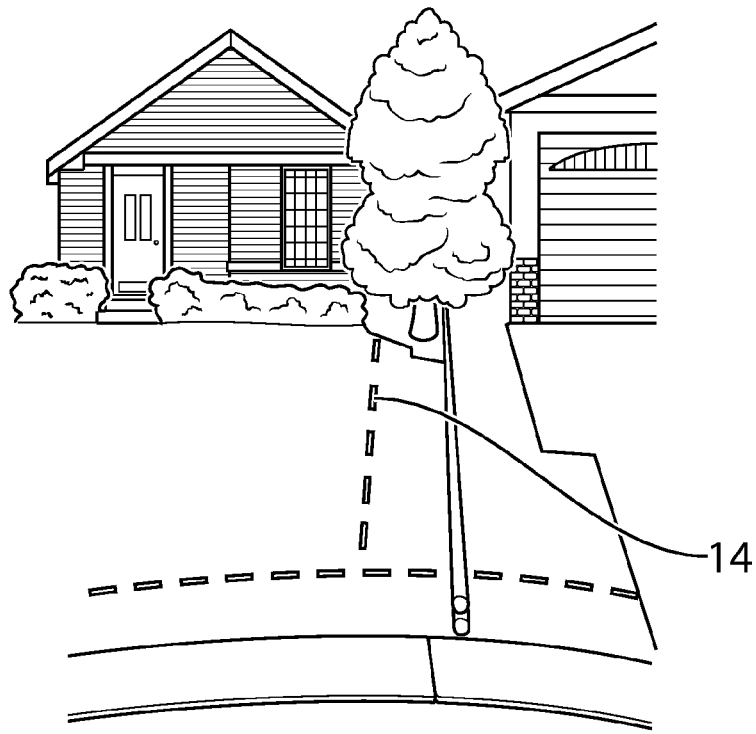
FIG. 2 is a digital photograph of an underground utility, enhanced by marking strips.

Method:

The present method is intended to go beyond what utility company personnel presently do. Referring to FIG. 1, utility company personnel presently go to a worksite, locate an underground utility with their electronic equipment and spray paint markings 12 on the road, parking lot, or ground. Those spray painted markings 12 will be gone at the first stage of ground disturbance excavation, when asphalt, concrete, sod or top soil is removed. Referring to FIG. 2, although the present method could utilize the marking left by utility company personnel, a preferred first step involves overlaying temporary marking strips 14 over the spray point marking 12 left by utility company personnel to create a more vivid marking. A preferred next step involves taking at least one digital photograph, as represented by FIG. 2, of the marking, as enhanced by marking strips 14, with a smart phone having both digital photograph taking and global positioning system (GPS) tracking capability to document the location of the marking. By referring to the photograph of FIG. 2, after the sod and top soil is removed, the ground disturber can determine where the markings were with reference to sidewalks, driveways, hedges and other visual references depicted in the photograph. It will be appreciated that on larger projects, more than one digital photograph may be taken of the marking and the digital photographs electronically stitched together to form a composite digital photograph.

Figure 3:
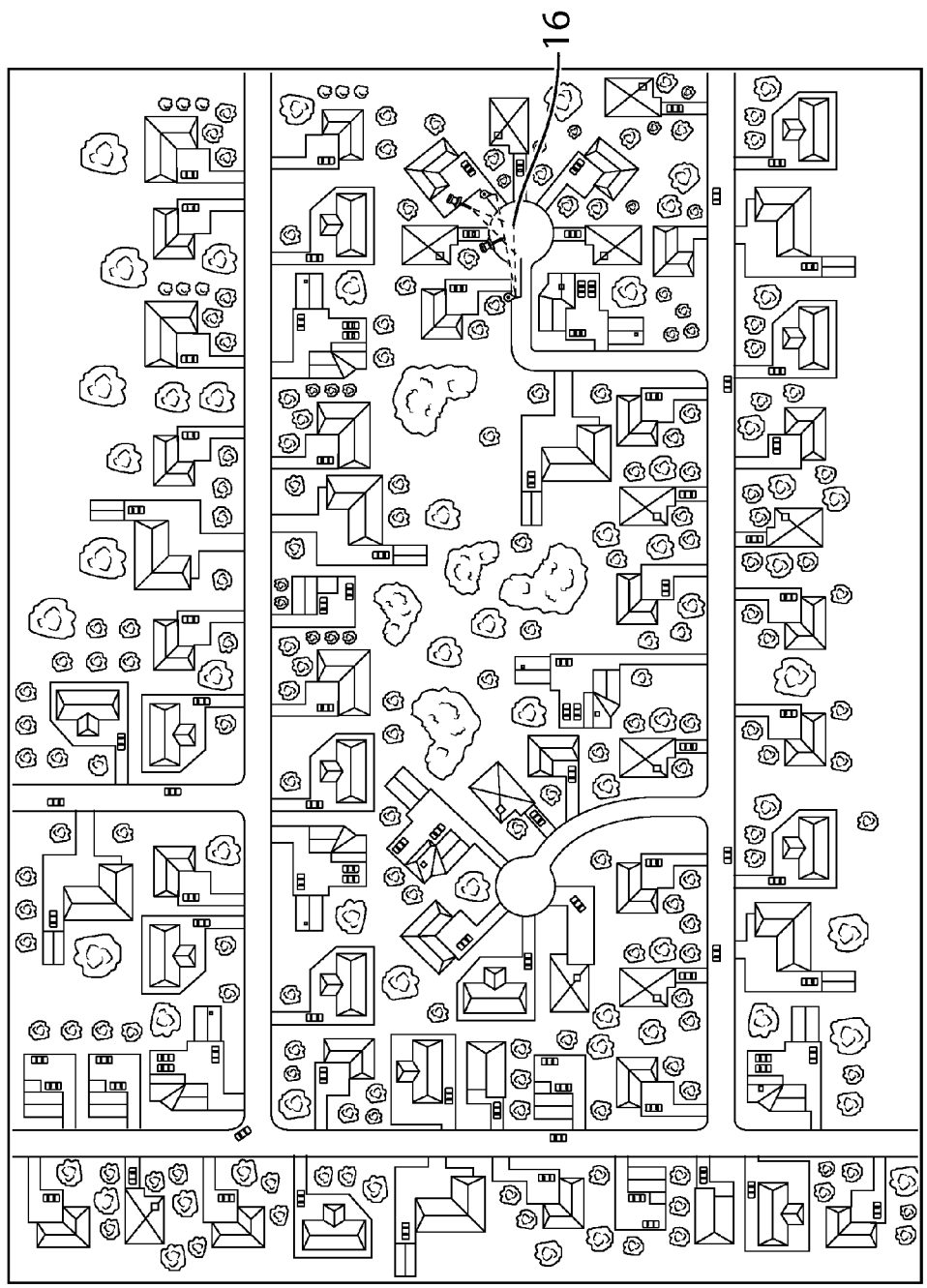
FIG. 3 is a GOOGLE MAP image created from GPS coordinates from the digital photograph in FIG. 2.
Figure 4:
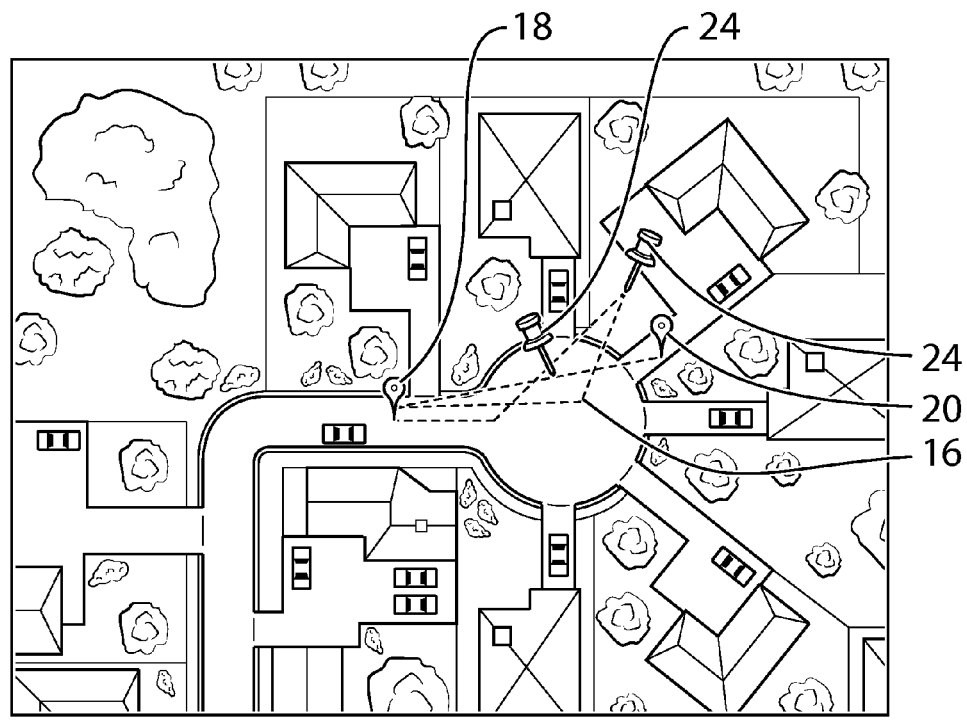
FIG. 4 is a "zoomed in" image of the GOOGLE MAP image from FIG. 3.

Referring to FIG. 3, a preferred next step involves providing GPS data to supplement the visual information provided by the digital photograph of FIG. 2. An internet mapping site is used to superimpose the GPS data on a neighbourhood map. The GPS mapped path is identified by reference numeral 16. GOGGLE MAPS has been used for the purpose of illustration. Referring to FIG. 4, GOGGLE MAPS has a "zoom in" and "zoom out" capability, enabling the ground disturber to get whatever view is required to place matters in context. A smart phone with a GPS application sends out locate "pings" at intervals. Those "pings" are like pins on a GOGGLE MAP. The GOGGLE MAP then draws lines between the pins which depict the area of travel of the person carrying the smart phone. The timing of the "ping" intervals can be set as desired. One can slowly walk the utility with the "ping" interval set for every 10-20 seconds. It is also possible for the locate crew to concurrently map as they are operating the locate equipment. If this is the case, one would want to set the "ping" interval to 10-20 minutes, depending upon the rate at which the locate equipment operates. The "ping" interval must be kept in mind whenever there is a change in direction. For example, with a 20 second ping interval, one would need to pause both before and after negotiating a turn, so that the positioning of the turn would be captured by a before and after "ping". In mapping the GPS path 16 as shown on FIG. 4, a starting position is indicated by reference numeral 18 and an end position is indicated by reference numeral 20. As the mapping is performed, data capture is performed at each "ping" position, two of many have been identified and indicated by reference numeral 24. It must be borne in mind, that the "ping" interval for a small excavation site, will be a matter of 10-20 seconds. Whenever, there is a change in direction, one pauses both before and after negotiating a turn, to ensure that the positioning of the turn is captured by a before and after "ping". The critical aspect is that readings are taken at set time or set distance intervals, with additional readings being taken at critical points, such as where there is a change in direction.

Additional Features
Audio Capture

GOOGLE MAPS has a feature that enables the capture of audio. This enables a running commentary to be made, which can include audible directions.

Colour Coding of Visual Markings

Figure 5:
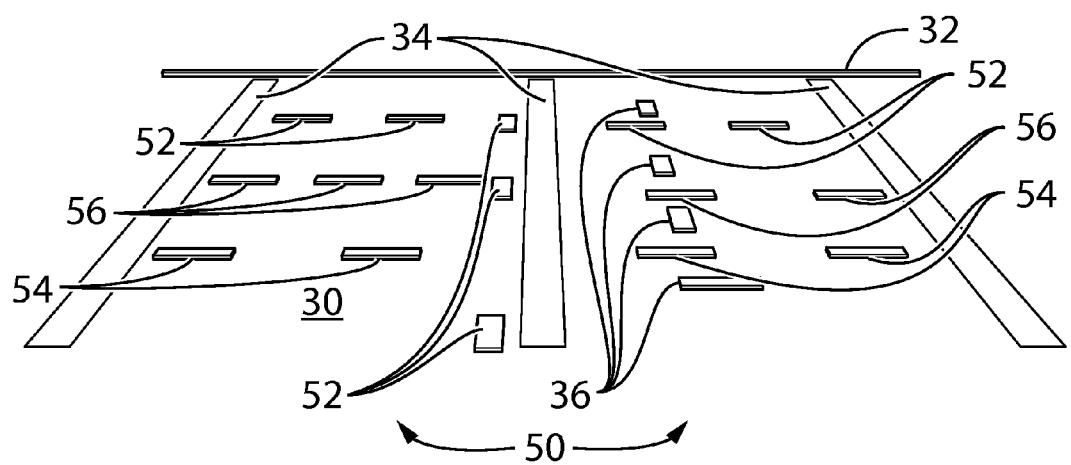
FIG. 5 is a diagrammatic representation of an excavation taking place in a parking lot.

Referring to FIG. 5, there is provided a picture of an excavation taking place in an asphalt parking lot 30. Parking lot 30 has a curb border 32 and lines 34 that indicate the white lines designating the parking spaces. Utility lines, are generally identified by reference numeral 50. A variety of different types of utility lines often run along the same utility right of way. For this reason, there is a standard colour coding has been developed to identify different types of utility lines. Marking strips 14 described in reference to FIG. 2, are selected in the appropriate colour. In FIG. 5, there are Yellow marking strips 52 indicating fluids such as gas, oil, steam, petroleum; Green marking strips 54 indicating sewers and drain lines; and Red marking strips 56 indicating electric power lines, cables, and conduit. White marking strips 36 indicates the offsets of the proposed excavation.

The reference picture taken, includes all coloured utility markings and proposed excavation offsets. After the asphalt has been removed, the ground disturber can determine where the markings were with reference to curb border 32 and parking space lines 34 and other visual references depicted in the photograph which remain. This visual reference should reduce the redundancy and frequency of a physical locate being performed. Cross-check verification can be made using the GPS mapping feature described above with reference to FIG. 4.

With the development of unmanned aerial drones, an aerial drone can be used to fly over the site of the underground utility taking digital photos to which GPS coordinate data is linked. The GPS coordinate data may then be used to superimpose the location of the underground utility onto the photo to create a geo-referenced orthomosaic aid of the GPS linked digital photographs with point cloud GPS data sets.

Advantages:

The method, as described above, provides the following advantages:

1. The digital photograph of the underground structure location can provide a visual reference after asphalt, concrete, sod, top soil or other ground covering has been removed.

2. The digital photograph is easier to understand for the ground disturber or less technically experienced ground disturber, who can work from visual landmarks in the photograph, such as sidewalks, driveways, trees and hedges.

3. The GPS tracker stamps a date and time on the document and in addition will show the overall activity in the direct vicinity of the locate request.

4. The digital photograph may be linked to a Google map for reference purposes.

5. The digital photograph gives a precise overview of the field work performed.

6. The digital photograph can be immediately reviewed from multiple sources for quality control and project coordination purposes.

7. The digital photograph of the locate work can be overlaid with a damage investigation digital photograph to prove or disprove liability before a judicial dispute.

8. Any alteration to the document can be easily detected.

9. The document can be scanned and saved as a permanent record for the Utility.

10. The digital photograph can be stitched with adjoining digital photograph to create a map.

11. The digital photograph with the marking strips is easier to see than a digital photograph of paint marks on the ground. The marking strips can be used to record a field locate in any type of weather.

12. Offsets can recorded using the marking strips.

13. Geo-referenced orthomosaic aids can be developed by combining the GPS linked digital photographs with point cloud data sets.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

The scope of the claims should not be limited by the illustrated embodiments set forth as examples, but should be given the broadest interpretation consistent with a purposive construction of the claims in view of the description as a whole.

What is claimed is:

1. A method of documenting a position of an underground utility, the method comprising:

prior to commencing excavation, placing temporary markings on a ground surface designating an underground location of the underground utility; and taking at least one photograph providing an overhead panoramic view of the temporary markings designating the underground location of the underground utility, with each at least one photograph including visual landmarks, thereby providing a visual reference; and after excavation has taken place and the temporary markings have been removed along with the around surface, using the at least one photograph to reconfirm the underground location of the underground utility by using the visual reference provided by a relationship that the temporary markings depicted in the at least one photograph bear to the visual landmarks that remain after excavation.

2. The method of claim 1, wherein the step of taking of the at least one photograph is performed with a digital camera having a global positioning system (GPS) application, and the GPS providing verification of the position from which the photograph was taken.

3. The method of claim 2, wherein a further step is taken of mapping with the GPS application in the digital camera the temporary markings depicted in the at least one photograph, such that GPS data can be superimposed on a neighbourhood map of an internet mapping site.

4. The method of claim 2, wherein the photograph from the digital camera is combined with GPS data concerning the underground utility to create a geo-referenced orthomosaic.

5. The method of claim 2, wherein the photograph is taken using a remotely controlled aerial drone.

6. The method of claim 2, wherein the mapping with the GPS application takes place contemporaneously with locating the underground utility by taking GPS readings at set time or distance intervals.

7. The method of claim 2, wherein the mapping with the GPS application takes place subsequent to locating the underground utility by taking GPS readings at set time or distance intervals.

8. The method of claim 2, wherein more than one digital photograph is taken and electronically stitched together to form a composite digital photograph.

9. The method of claim 2, wherein the GPS mapping is accompanied by an audio commentary.

10. The method of claim 1, wherein the at least one photograph is a colour photograph and the temporary markings are colour coded to designate a nature of each underground utility depicted in the photograph.

11. The method of claim 10, wherein a plurality of colour coded temporary marking strips are overlaid over the temporary markings prior to taking the at least one photograph.

12. The method of claim 1, wherein the temporary markings are used to designate offsets.

* * * * *

UNITED STATES PATENT AND TRADEMARK OFFICE
CERTIFICATE OF CORRECTION

PATENT NO. : 9,766,062 B2  
APPLICATION NO. : 14/747030  
DATED : September 19, 2017  
INVENTOR(S) : Frederick D. Lake Page 1 of 1

It is certified that error appears in the above-identified patent and that said Letters Patent is hereby corrected as shown below:

In the Specification

Column 3, Line 18, change "GOGGLE MAPS" to -- GOOGLE MAPS --;

Column 3, Lines 19-20, change "GOGGLE MAPS" to -- GOOGLE MAPS --;

Column 3, Line 24, change both occurrences of "GOGGLE MAPS" to -- GOOGLE MAPS --;

In the Claims

Column 6, Line 9, change "6. The method of claim 2, wherein the mapping" to -- 6. The method of claim 3, wherein the mapping --;

Column 6, Line 13, change "7. The method of claim 2, wherein the mapping" to -- 7. The method of claim 3, wherein the mapping --; and Column 6, Line 20, change "9. The method of claim 2, wherein the GPS mapping" to -- 9. The method of claim 3, wherein the mapping --.

Signed and Sealed this  
Third Day of April, 2018

Andrei Iancu  
*Director of the United States Patent and Trademark Office*